United States Patent [19]
Fujita

[11] Patent Number: 4,727,957
[45] Date of Patent: Mar. 1, 1988

[54] RUBBER VIBRATION ISOLATOR FOR MUFFLER

[75] Inventor: Akio Fujita, Fujisawa, Japan

[73] Assignee: Bridgestone Corporation, Tokyo, Japan

[21] Appl. No.: 945,752

[22] Filed: Dec. 23, 1986

[30] Foreign Application Priority Data

Dec. 25, 1985 [JP] Japan .................................. 60-296192

[51] Int. Cl.⁴ ............................................. F16F 15/00
[52] U.S. Cl. ..................................... 181/208; 248/60; 248/613; 267/141.1; 267/292
[58] Field of Search ................................. 181/207–209, 181/243; 248/58–60, 610, 612, 617, 317; 267/63 R, 141.1, 141.3, 153

[56] References Cited

U.S. PATENT DOCUMENTS 4,274,761  6/1981  Boguth .................... 267/141.1 X
4,660,797  4/1987  Tonnies ..................... 267/63 R X Primary Examiner—Benjamin R. Fuller
Attorney, Agent, or Firm—Jordan and Hamburg

[57] ABSTRACT

A rubber vibration isolator is used as a muffler hanger or muffler mount between a car body and a muffler to hang the latter from the former. The isolator includes a body made of rubber-like elastic material whose damping factor is high, two holes, upper and lower, formed in the center of the body of rubber-like elastic material, and a weight provided between the two holes and supported at opposite sides thereof by rubber-like elastic members. The rubber vibration isolator is advantageous in that coefficients of transfer of vibrations of both high and low frequencies, respectively, are lowered.

3 Claims, 8 Drawing Figures

RUBBER VIBRATION ISOLATOR FOR MUFFLER

BACKGROUND OF THE INVENTION

The present invention relates to a rubber vibration isolator for a muffler, intended for use between the body of a car and the muffler.

The conventional rubber vibration isolators of this type are called "muffler hanger" or "muffler mount" and are used to reduce the vibration transferred from the exhaust pipe located on the bottom of the body of a car when the car is running. For example, the conventional muffler hanger 100 serves to hang the muffler 1 from the car body 2 as shown in FIG. 6. For this purpose, a muffler hanger shown in FIG. 7 or FIG. 8 has been used. The muffler hangers 100 shown in FIGS. 7 and 8 are made entirely of a rubber-like elastic material.

The conventional muffler hanger 100 made entirely of rubber suppresses vibration of low frequency (10 to 20 Hz) but transfers vibrations of high frequency (50 to 150 Hz) at a high coefficient. If a rubber housing a low vibration damping factor is used to lower the coefficient of vibration transfer in the high-frequency band, it will transfer a vibration of low frequency with a high coefficient.

SUMMARY OF THE INVENTION

An object of the present invention is to overcome the above-mentioned drawbacks of the prior art by lowering both the coefficients of transfer of vibrations of high and low frequencies, respectively.

The above object can be attained by providing a rubber vibration isolator for a muffler for use between the body of a car and the muffler, the isolator including a body made of a rubber having a high vibration damping factor for suspending the muffler from the car body, two holes, upper and lower, formed in the center of the body of rubber-like elastic material, and a weight provided between the two holes and supported at opposite sides thereof by means of rubber-like elastic members.

According to the present invention, the coefficient of transfer of high-frequency vibration can be lowered since the weight supported by the rubber-like elastic members works as a dynamic damper. Also, because the body is made of a rubber-like elastic material whose vibration damping factor is high, the vibration level in the lower-frequency band can be made as low as that of the conventional vibration isolator. Furthermore, the vibration isolator of the present invention can be installed in a known manner. It does not need a wider space for installation and also meets the requirements for vibration damping in both the low-and high-frequency bands with a minimum increase of costs.

These and other objects and advantages of the present invention will be better understood from the ensuing description of an embodiment of the rubber vibration isolator according to the present invention in conjunction with the drawings.

DETAILED DESCRIPTION OF THE PREFERRED EMBODIMENTS

Figure 1:
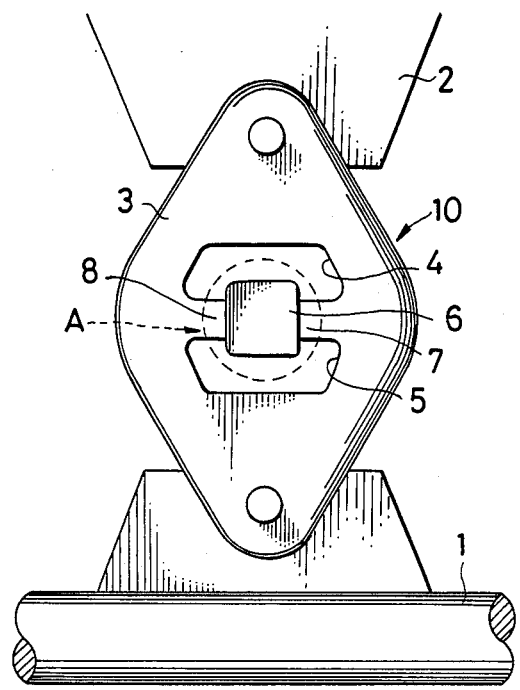
FIG. 1 is a side elevation view of a preferred embodiment of the present invention.

The rubber vibration isolator according to the embodiment shown in FIG. 1, generally indicated as 10, is constructed as a muffler hanger as in conventional vibration isolators. The rubber vibration isolator 10 has a body 3 made of a rubber-like elastic material whose vibration damping factor is high and which is used to suspend a muffler 1 from the body of a car. Two holes 4 and 5, upper and lower, are formed in the center of the body 3, and there is provided between these two holes 4 and 5 a weight 6 having opposite sides each supported by a rubber-like elastic member. A part of each rubber-like elastic member supporting the weight 6 forms the support members 7 and 8. It is well known that installation of a dynamic damper to a vibrating object can effectively minimize the transfer of vibration, but there has never been proposed use of such a dynamic damper as a rubber vibration isolator for a muffler, for example, a muffler hanger or muffler mount. As it is necessary to provide a rubber vibration isolator which occupies only a limited space and also costs as little as possible, it is difficult or disadvantageous from the standpoint of space and cost to use any rubber vibration isolator of a complicated construction. Therefore, the present invention was worked out for the purposes that such a rubber vibration isolator can be installed in a known manner in an extremely narrow space at a minimum cost.

The above-mentioned weight 6 is made of a mass of metal which may be bonded by vulcanization to the support members 7 and 8 made of rubber-like elastic material. The portion indicated with an arrow A in FIG. 1 functions as a dynamic damper.

Figure 2:
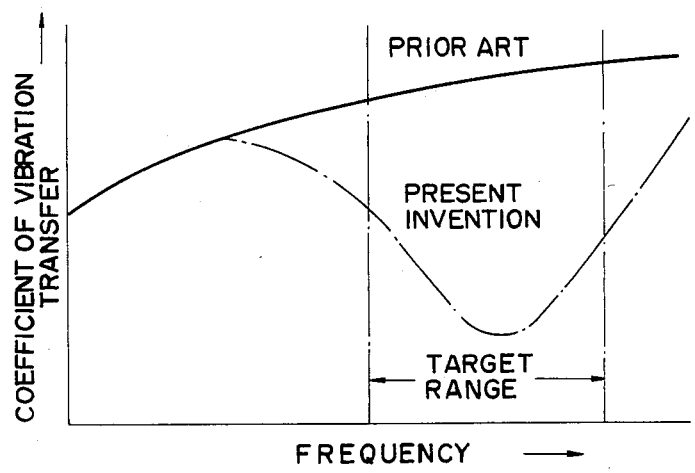
FIG. 2 graphically shows a comparison between the conventional vibration isolator and the embodiment of the present invention, from which the relation between the frequency of vibration and the coefficient of vibration transfer will be apparent.
Figure 3:
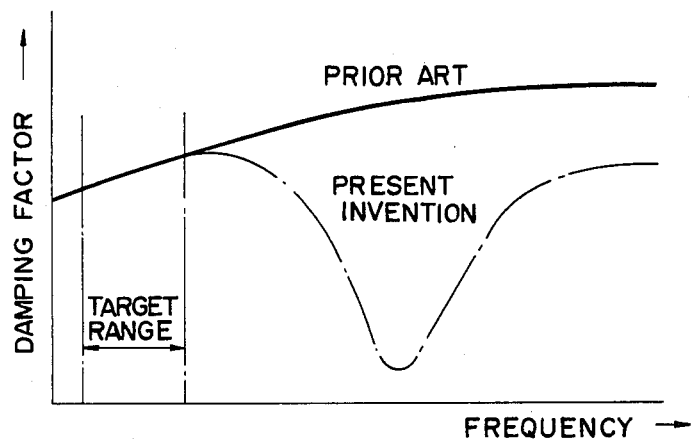
FIG. 3 also graphically shows a comparison between the conventional vibration isolator and the embodiment of the present invention, from which the relation between the frequency and the damping factor is revealed.

As described in the foregoing, with the arrangements of the embodiment of the present invention, it is possible to considerably reduce the coefficient of vibration transfer in a high-frequency band as compared with conventional vibration isolators, which will be apparent from FIG. 2. Also, the damping factor of the inventive rubber vibration isolator in a low-frequency band is nearly the same as in conventional vibration isolators, as shown in FIG. 3.

Figure 4:
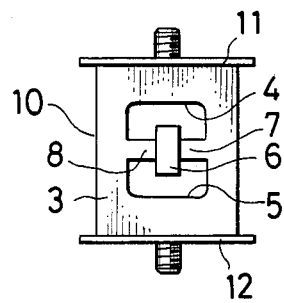
FIGS. 4 and 5 are front views, respectively, of the inventive rubber vibration isolators adopted as muffler mounts, respectively.
Figure 5:
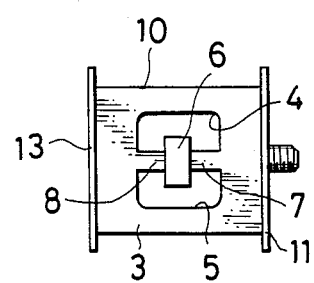
Figure 6:
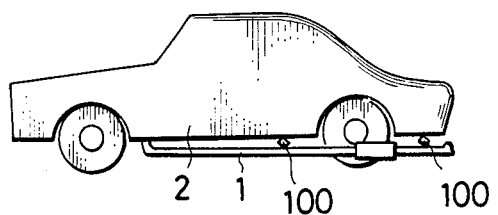
FIG. 6 is a schematic side elevation view of the inventive rubber vibration isolator used as a muffler hanger, showing the isolator in the installed position.
Figure 7:
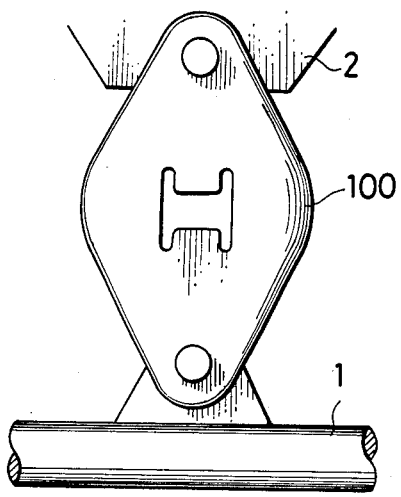
FIGS. 7 and 8 are side elevation views, respectively, of conventional rubber vibration isolators.
Figure 8:
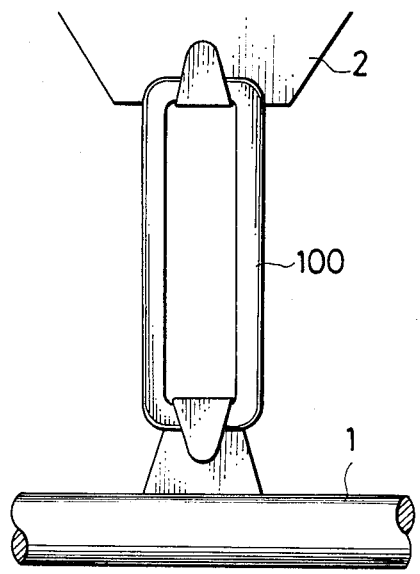

The embodiments shown in FIGS. 4 and 5 are the inventive rubber vibration isolators, respectively, constructed in the form of muffler mounts. As shown, a rubber-like elastic member is interposed between metal pieces 11 and 12 or 11 and 13. The rubber-like elastic member comprises a body 3, holes 4 and 5, weight 6, and supports 7 and 8 as in the first embodiment.

What is claimed is:

1. A rubber vibration isolator adapted for use between a body of a car and a muffler, comprising:
   a unitary body made of rubber-like elastic material having a central area and a high damping factor for suspending the muffler from the car body and dampening low frequency vibrations;

an upper hole and a lower hole formed in the center of the body of rubber-like elastic material;

a dynamic damper comprising a metal weight having opposite sides and supported between said upper and lower holes for dampening high frequency vibrations; and rubber-like elastic members connecting said body of rubber-like elastic material and said opposite sides of said weight for supporting said weight between said upper and lower holes.

2. A rubber vibration isolator as in claim 1, wherein said rubber-like elastic members are formed integrally with said body of rubber-like elastic material.

3. A rubber vibration isolator as in claim 1, wherein said metal weight is bonded to said rubber-like elastic members by vulcanization.

* * * * *